United States Patent

[11] 3,600,962

| [72] | Inventor | Peter G. Ivanchich<br>Dearborn, Mich. |
|---|---|---|
| [21] | Appl. No. | 865,841 |
| [22] | Filed | Oct. 13, 1969 |
| [45] | Patented | Aug. 24, 1971 |
| [73] | Assignee | Ford Motor Company<br>Dearborn, Mich. |

[54] MULTIPLE RATIO, MANUALLY CONTROLLED POWER TRANSMISSION MECHANISM WITH SELF ENERGIZING NEUTRAL CLUTCH
8 Claims, 11 Drawing Figs.

[52] U.S. Cl. .................................................. 74/331,
74/371, 74/372
[51] Int. Cl. .................................................. F16h 3/08
[50] Field of Search .......................................... 74/330,
331, 371, 372; 192/89

[56] References Cited
UNITED STATES PATENTS

| 1,437,412 | 12/1922 | Girling | 192/89 |
|---|---|---|---|
| 1,947,033 | 2/1934 | Bush | 74/372 X |
| 2,416,154 | 2/1947 | Chilton | 74/330 |
| 2,971,403 | 2/1961 | Butterworth | 74/371 X |
| 3,283,613 | 11/1966 | Perkins | 74/331 X |
| 3,399,580 | 9/1968 | Ivanchich | 74/331 |

*Primary Examiner*—Arthur T. McKeon
*Attorneys*—John R. Faulkner and Donald J. Harrington

ABSTRACT: A power transmission mechanism having coaxially arranged power output gears, a clutch sleeve shaft surrounding the power output shaft and adapted to slide on the output shaft into selective engagement with the output gears and a multiple disc neutral clutch connecting drivably the clutch sleeve shaft with the power output shaft including self energizing cam means for engaging the clutch with a clamping force that is proportional in magnitude to the driving torque, provision being made for manually disengaging and engaging the multiple disc assembly during speed ratio changes.

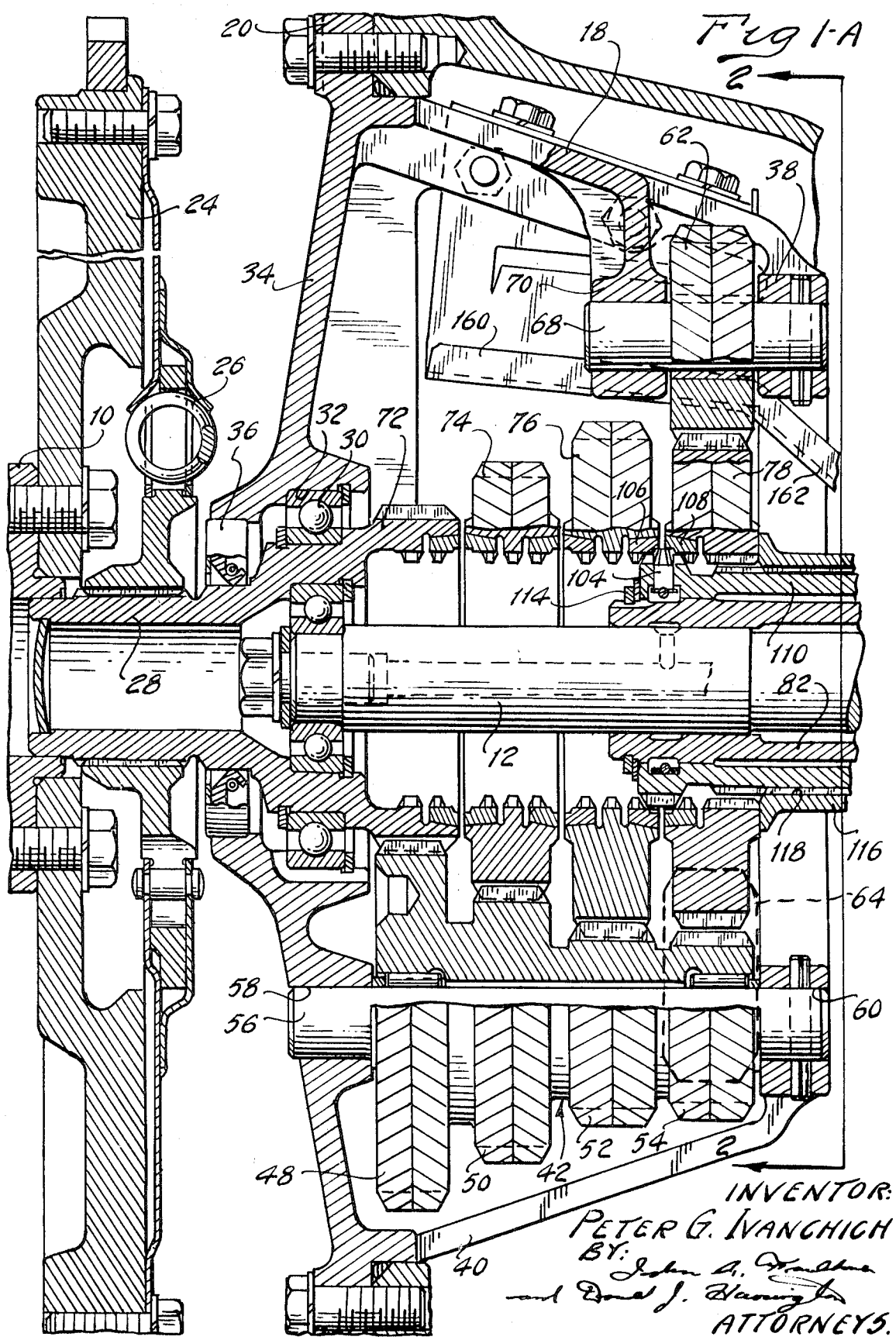
Fig 1-A
INVENTOR:
PETER G. IVANCHICH
BY:
ATTORNEYS.

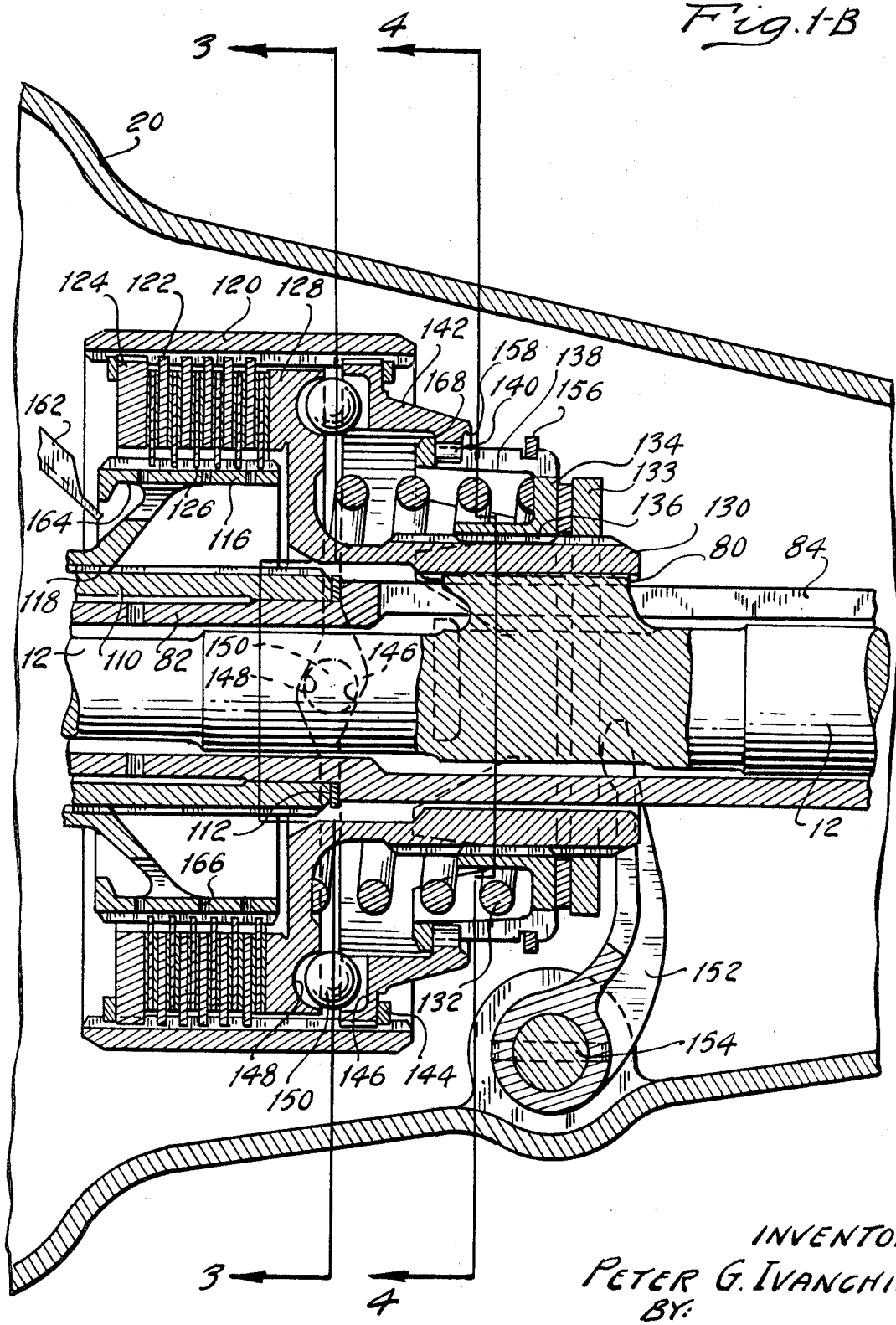

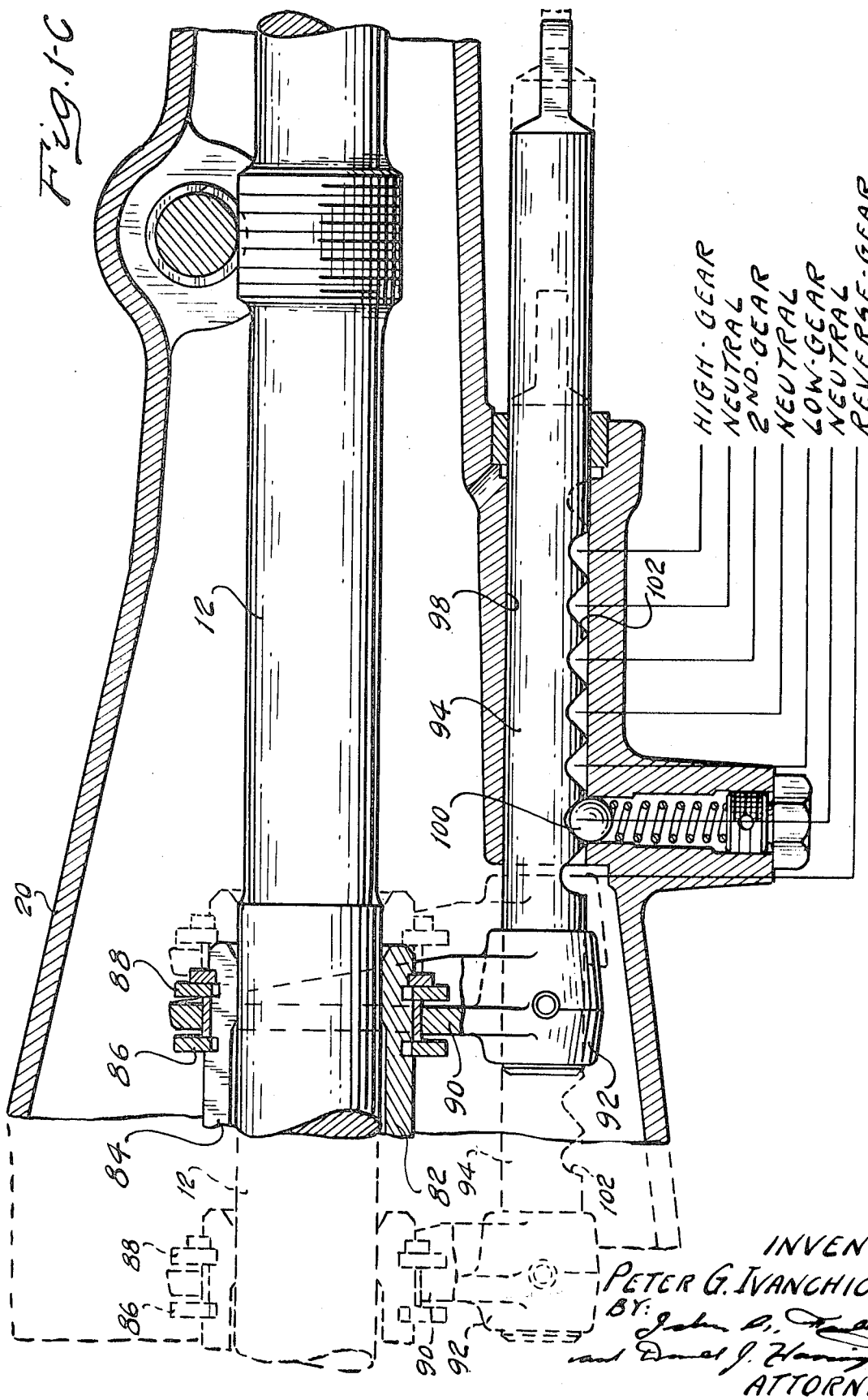

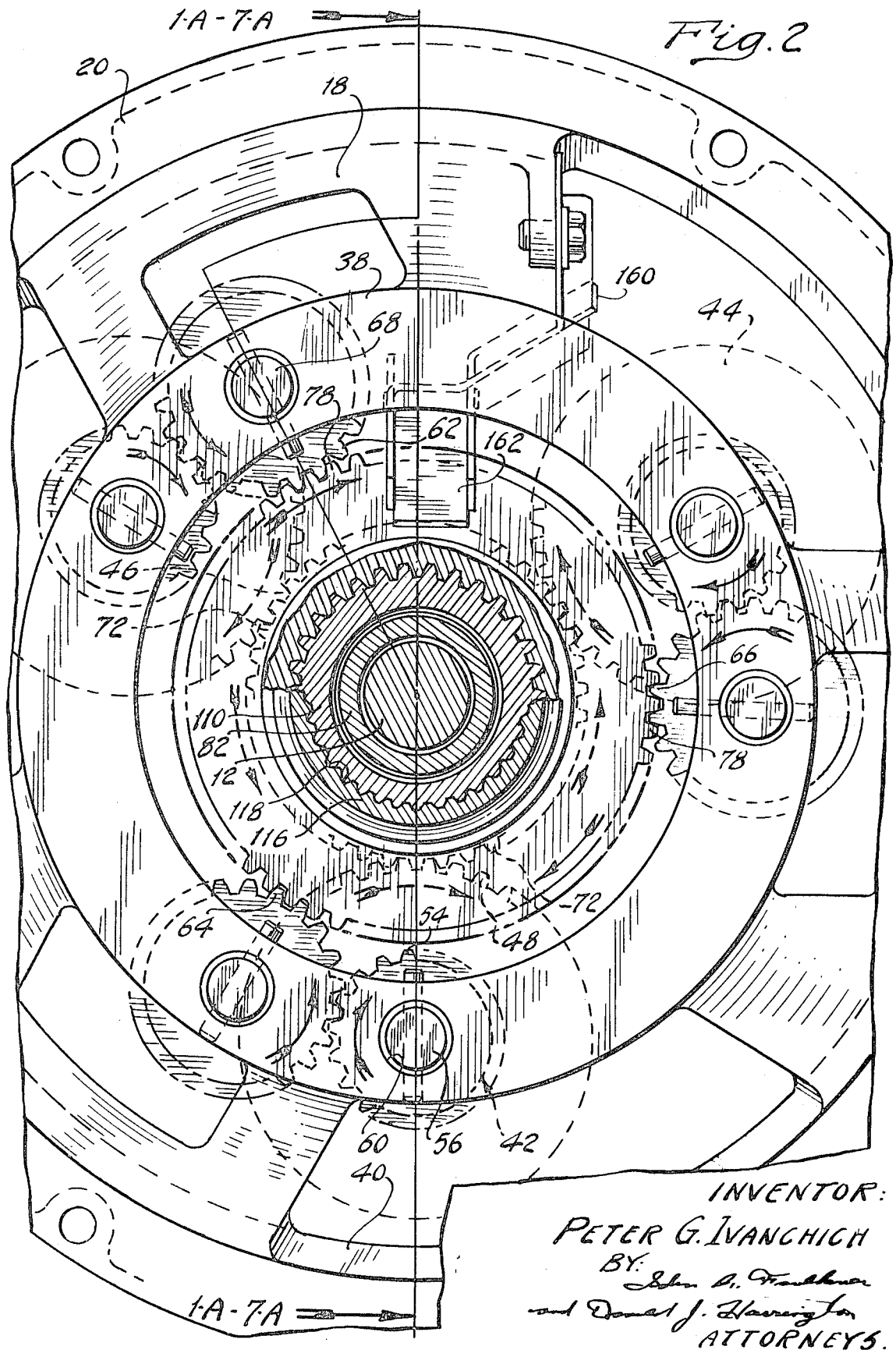

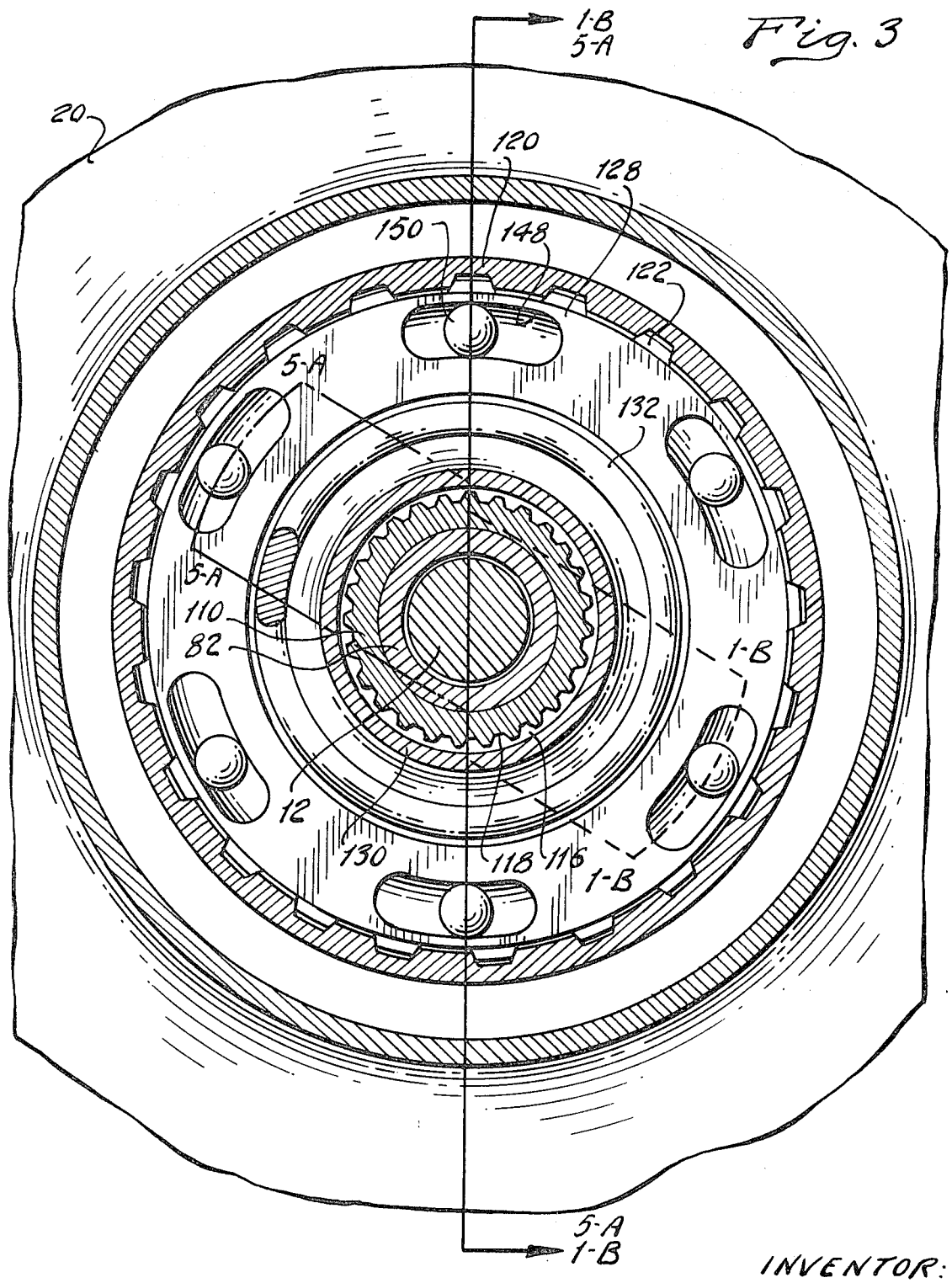

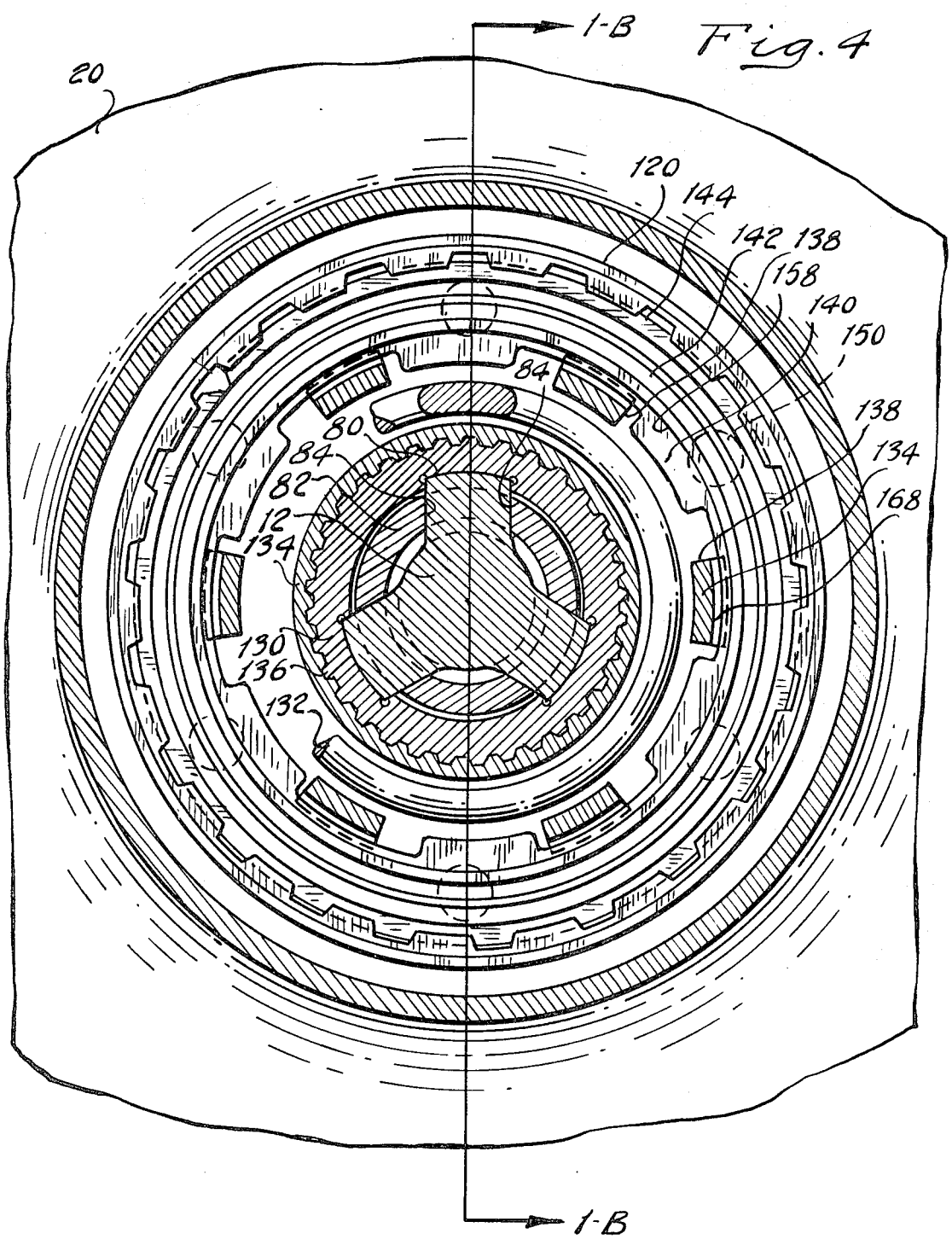

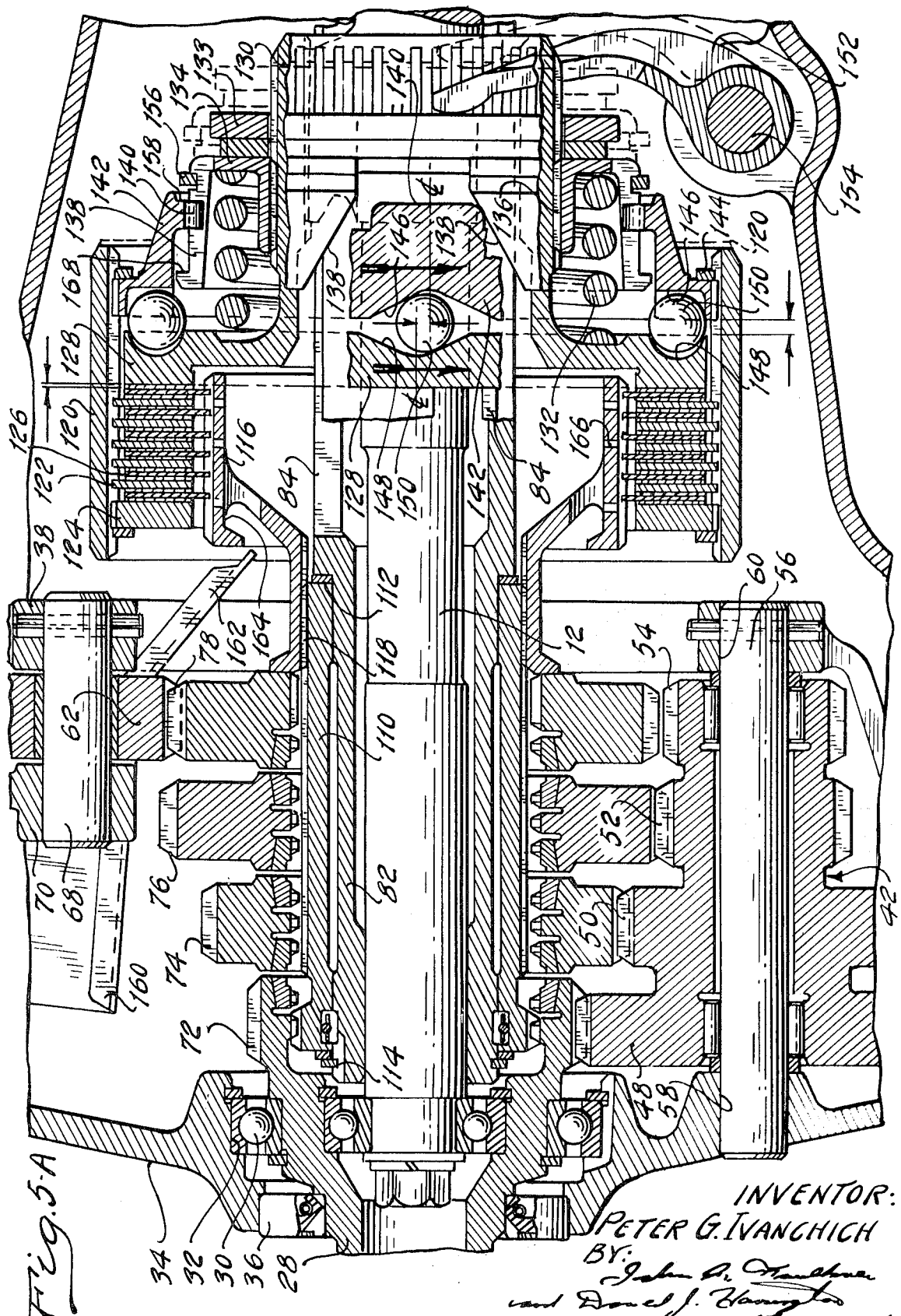

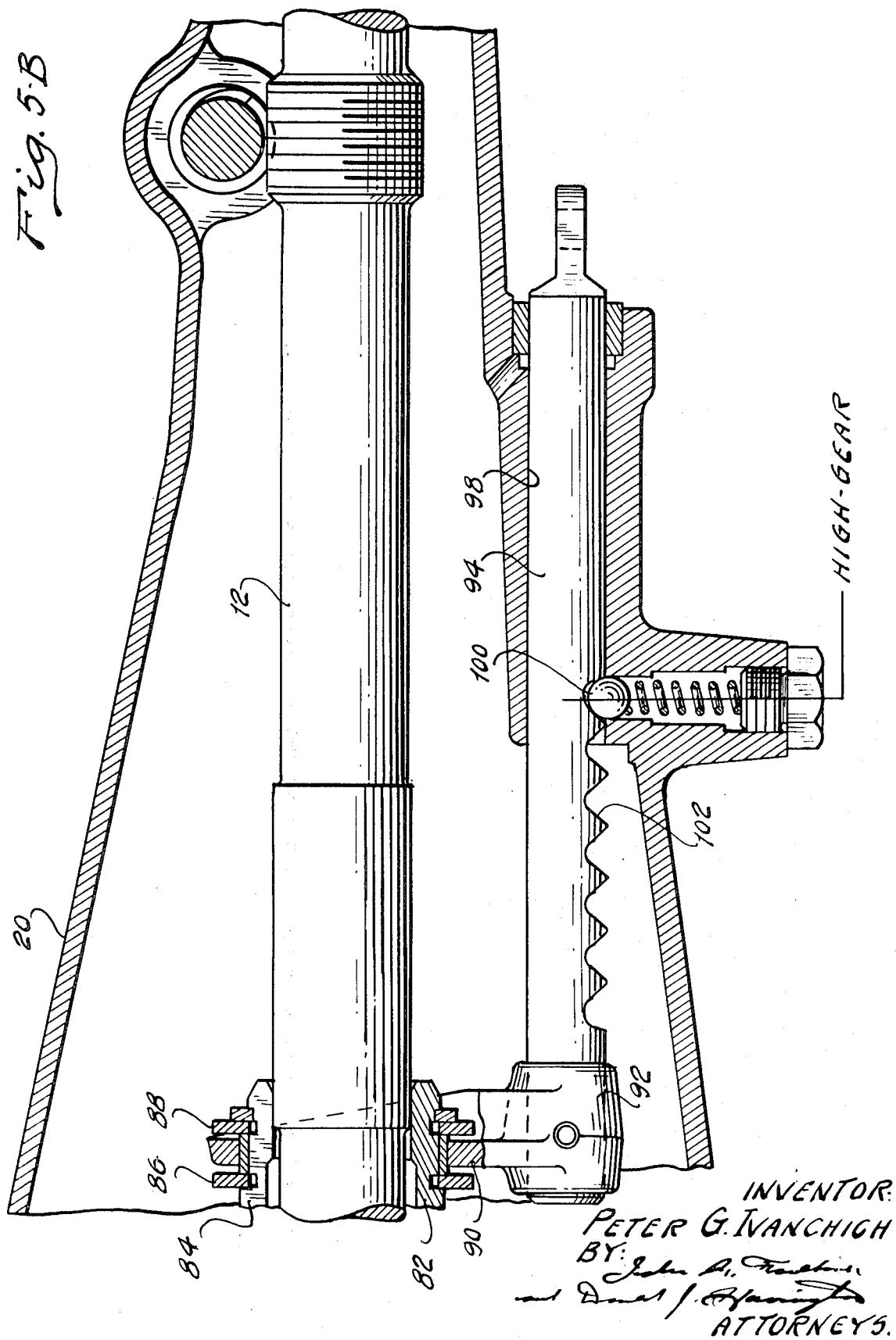

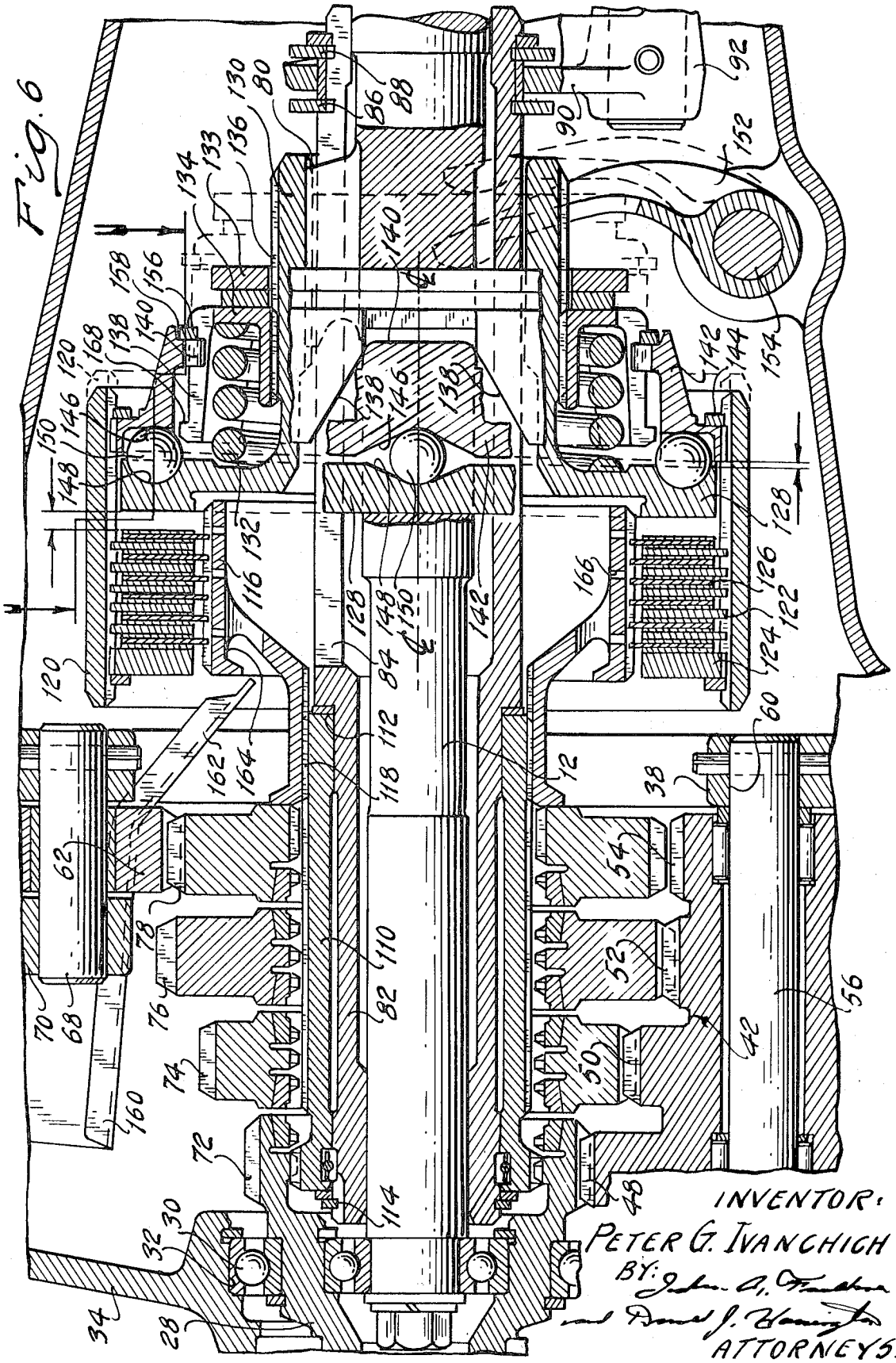

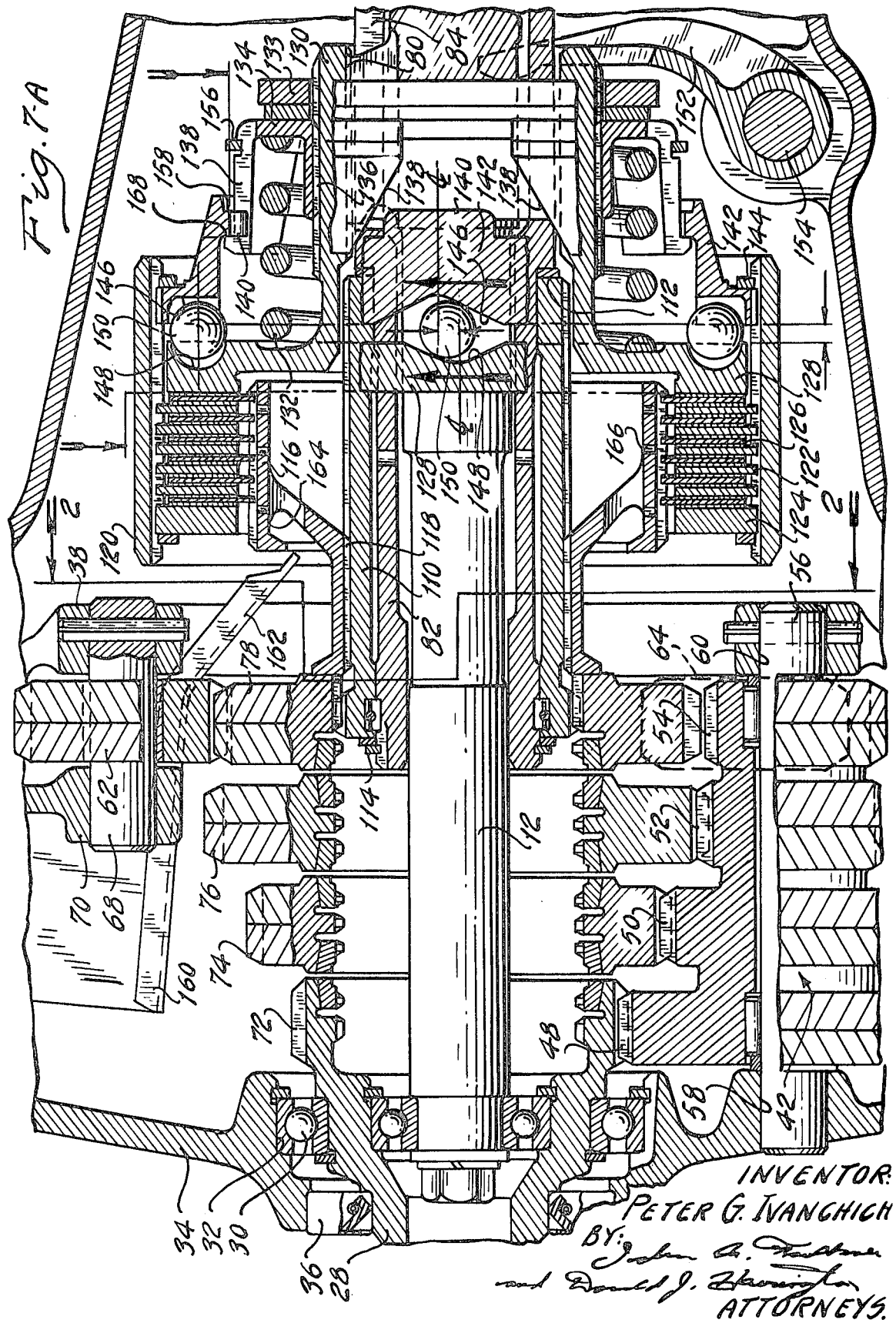

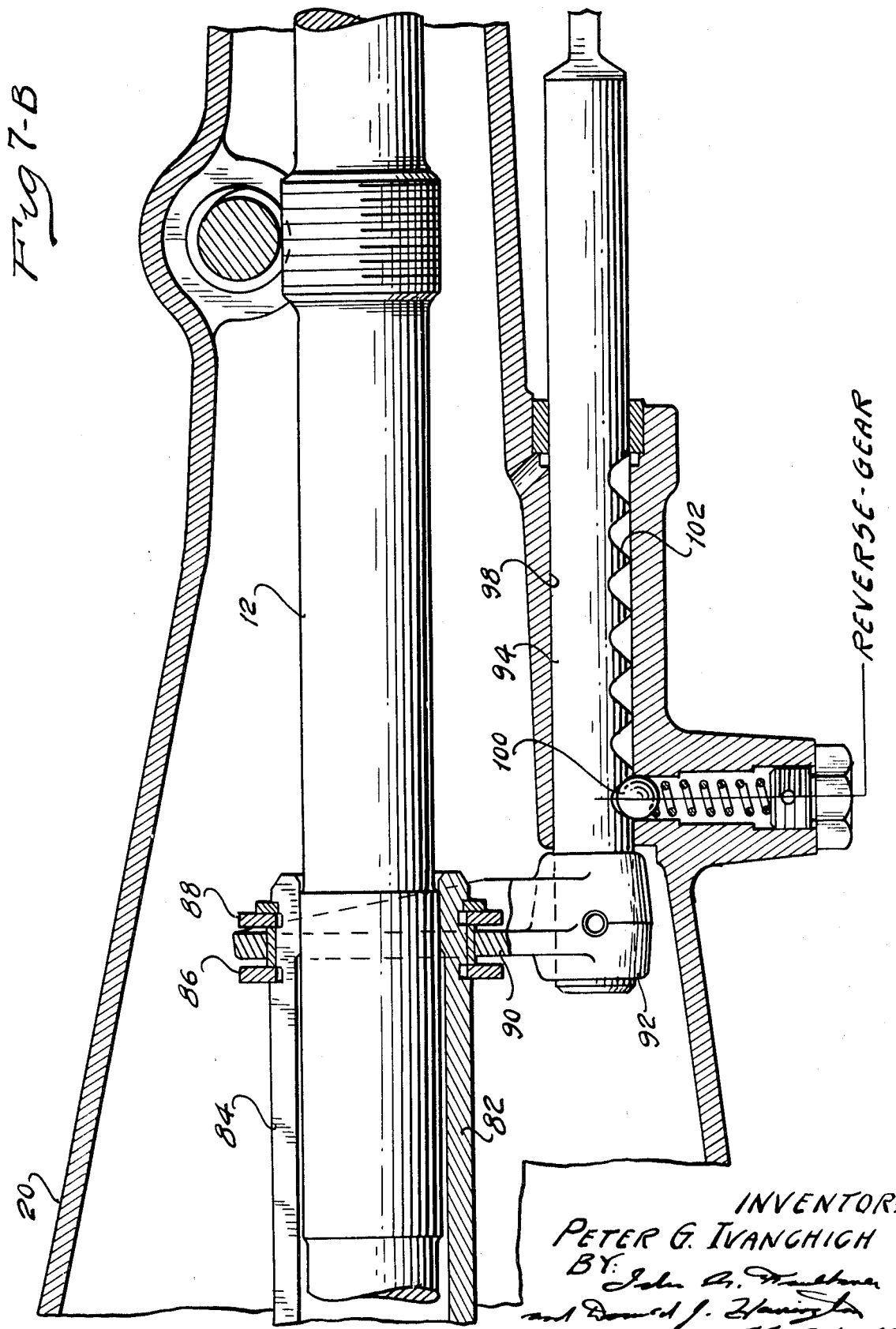

MULTIPLE RATIO, MANUALLY CONTROLLED POWER TRANSMISSION MECHANISM WITH SELF ENERGIZING NEUTRAL CLUTCH

GENERAL DESCRIPTION OF THE INVENTION

My invention relates to improvements in the structure shown in my U.S. Pat. Nos. 3,399,580; 3,386,302; 3,362,244 and 3,354,738. Each of these patents is assigned to the assignee of my invention.

The structure of the present disclosure has features that are common to the structure shown in my earlier patents, but it comprises an improved neutral clutch structure which forms an integral part of the torque transmitting elements of the gearing. As in my earlier designs, the torque transmitting gearing comprises a power input gear, which meshes with cluster gear assemblies mounted for rotation upon axes that are parallel to the common axis of the power input shaft and the power output shaft. A power input gear is connected directly to the power input shaft. The power output shaft is arranged coaxially with respect to the power output gears, the latter engaging continuously the gear elements of the cluster gear assemblies.

The gear elements of the cluster gear assemblies and the power output gears themselves are herringbone gears, the thrust forces acting on the gears due to the gear tooth loads being substantially balanced because of the configuration of the herringbone gear teeth. The output gears are supported by the cluster gear assemblies as they rotate about the axis of the power output shaft.

A first synchronizer clutch sleeve shaft surrounds the power output shaft. A second sleeve shaft surrounds the first clutch sleeve shaft and is rotatably mounted thereon, although it is fixed against relative axial shifting movement with respect to the first clutch sleeve shaft. Synchronizer clutch elements are carried by the second sleeve shaft so that when the first sleeve shaft is shifted axially, the second sleeve shaft is selectively engaged and disengaged with respect to the power output gears.

An externally splined clutch element is connected to the second clutch sleeve shaft and rotates therewith. A clutch drum surrounds the clutch element and carries multiple clutch disc, which register with disc carried by the externally splined clutch element. A clutch pressure plate, which is drivably connected to the power output shaft and adapted for axial movement relative thereto, is situated directly adjacent the clutch discs. A cam mechanism having a self energizing characteristics establishes a clamping force between the pressure plate and the clutch drum thereby connecting drivably the clutch element and the drum to permit transfer of substantially all of the driving torque through the clutch disc assembly. The torque is delivered directly through the cam means and through the pressure plate to the power output shaft. Only a small portion of the torque is delivered from the clutch element to the pressure plate.

Unlike the clutch disc assembly shown in my earlier U.S. Pat. No. 3,399,580, a single torque delivery path is established between the output element of the gearing and the power output shaft itself, and slipping of the clutch disc during torque transmission at increased torque levels is avoided.

The optimum clutch engaging characteristic during initial clutch engagement can be achieved without sacrificing the optimum clutch characteristics for high torque delivery following full clutch engagement. In this respect, my improved clutch structure is distinguished from the structure shown in U.S. Pat. No. 3,399,580, since, in that case, the clutch drum to which the disc of the clutch disc assembly were attached was in turn connected directly to the power output shaft, thereby contributing to excessive clutch slippage.

The increased number of discs which may be used with my instant design makes it simpler to effect cooling of the clutch discs. To assist in this, I have provided a trough which collects oil discharged from the rotating gear assemblies, which oil is delivered to the internal periphery of the rotating clutch discs. The oil then is centrifuged through the clutch disc pack to effect cooling and lubrication of the friction surfaces. It is possible with my instant design to effect a cushioned initial clutch engagement and to gradually increase the effective torque following clutch engagement because of the self energizing characteristics inherent in my design.

BRIEF DESCRIPTION OF THE FIGURES OF THE DRAWING

FIGS. 1A, 1B and 1C show in longitudinal sectional form, a preferred embodiment of my improved transmission mechanism. FIG. 1A is taken along the plane of section lines 1A—1A of FIG. 2 and FIG. 1B is taken along the plane of section lines 1B—1B of FIGS. 3 and 4.

FIG. 2 is a sectional view taken along the plane of section lines 2—2 of FIG. 1A.

FIG. 3 is a sectional view taken along the plane of section lines 3—3 of FIG. 1B.

FIG. 4 is a sectional view taken along the plane of section lines 4—4 of FIG. 1B.

FIGS. 5A and 5B show a sectional view taken along the plane of section line 5A of FIG. 3. FIG. 5A is taken along the plane of section line 5A—5A of FIG. 3.

FIG. 6 is a sectional view similar to the view shown in FIG. 1B, although the clutch elements of the neutral clutch assembly shown in FIG. 6 are illustrated in the disengaged position rather than in the engaged position shown in FIG. 1B.

FIGS. 7A and 7B show a view similar to FIGS. 1A and 1B, although portions of the neutral clutch structure shown in elevation and other portions are shown in sections to permit a more detailed understanding of the operation of the clutch structure. FIG. 7A is taken along the plane of section lines 7A—7A of FIG. 2.

PARTICULAR DESCRIPTION OF THE INVENTION

Numeral 10 designates one end of the crankshaft of an internal combustion engine. Numeral 12 designates a transmission power output shaft or tail shaft, which may be connected through a drive shaft and a differential and axle assembly to the traction wheels in an automotive driveline. Numeral 14 designates a transmission housing which encloses a shaft 12 and torque transmitting gearing. Its left hand end includes a flange 16, which may be bolted to the engine block for the vehicle engine (not shown).

The torque transmitting gearing is situated within a self contained housing 18 for the transmission mechanism. Housing 18 is flanged at 20 to permit a bolted connection with an internal shoulder 22 formed in the housing 14. The housing 18 and the gearing assembly enclosed by it can be removed and assembled readily as a unit as access to the interior of the housing 14 is permitted by the opening through the left hand end of the housing 14 when the latter is removed from the engine.

An engine flywheel 24 is secured to the end 10 of the crankshaft. It is connected drivably by means of a torsional damper driveplate 26 to power input shaft 28. The shaft is journaled by means of a bearing 30 within bearing opening 32 formed in forward wall 34 of the inner housing 18. A running shaft seal 36 surrounds the shaft 28.

The right-hand end of the housing 18 comprises a shaft support ring 38, which is connected to the forward wall 34 by structural flanges 40.

Three cluster gear assemblies, one of which is shown at 42, are drilled within the housing 18. Two other cluster gear assemblies are indicated in FIG. 2 by reference characters 44 and 46.

The cluster gear assemblies are equally spaced, as indicated in FIG. 2. Each of them comprises multiple gear elements indicated in FIG. 1A by reference characters 48, 50, 52 and 54.

The cluster gear assemblies are journaled rotatably on pinion shafts. The pinion shaft for cluster gear assembly 42 is shown at 56. Its end supported in shaft openings 58 and 60 formed in the forward wall 34 and in the supporting ring 38 respectively.

A reverse idler pinion, identified in FIG. 1A by reference character 62, is identical to two companion reverse idler gear elements 64 and 66 in FIG. 2.

Reverse idler pinion 62 is journaled on pinion shaft 68, which is end supported in shaft openings formed in the ring 38 and in an internal flange 70 formed in the housing 18.

Power input shaft 28 is connected directly to power input gear 72, which meshes continuously with input gear element 48 of the cluster gear assembly 42, as well as the companion gear element of the other cluster gear assemblies. Power output gears 74, 76 and 78 are journaled rotatably for rotation about the axis of the shaft 28.

As seen in FIG. 1B, a power output shaft 12 is formed with three radially projecting fingers 80. A first clutch sleeve 82 surrounds the shaft 12, and it includes longitudinally extending sleeve parts 84 situated between the fingers 80. The sleeve 82 thus is adapted to move axially with respect to the shaft 12 as the sleeve parts 84 are drawn through the angularly spaced openings between the fingers 80. The right-hand end of the sleeve parts 84 carry rings 86 and 88, which are held axially fast with respect to the sleeve 82. These define a groove within which is situated the extremity 90 of a shift fork 92, the collar of which is connected to shifter shaft 94. This in turn is slidably received in shaft opening 98 formed in the housing 14.

A detent mechanism in the form of a spring loaded ball 100 and detent recesses 102 in the shaft 98 establish definite operating positions for the shift fork collar 92. These operating positions are identified in FIG. 1C by the legends "high gear," "neutral," "second gear," "neutral," "neutral," "low gear," "neutral" and "reverse gear."

The left-hand end of the sleeve 82 carries synchronizer clutch teeth 104, which are adapted to engage selectively internal clutch teeth formed in each of the gears 72, 74, 76 and 78. Suitable synchronizer blocker rings 106 and 108 are provided for each of the gears to permit synchronizing motion of the gears with respect to the clutch element 104 prior to engagement of the gears with respect to the sleeve 82.

The synchronizer clutch element 104 forms a part of a secondary clutch sleeve 110 carried by the sleeve shaft 82. It is journaled for independent rotation with respect to the shaft 82, although it is fixed against axial movement with respect to the shaft 82, a reaction shoulder and thrust washer 112 being provided for this purpose. The sleeve 110 is locked to the sleeve 82 by snap ring 114. A clutch element 116 is splined at 118 to the sleeve 110. When the clutch element 104 is moved into clutching engagement with either one of the other of the blocker rings 106 and 108 or any one of the gears, the only rotating mass that will affect the inertia forces during the shift interval are the masses of the clutch element 104 and the sleeve 110. The mass of the sleeve 82 and the other torque delivery elements does not affect the inertia forces.

A clutch drum 120 surrounds the element 116 which carries clutch disc 122 and a reaction disc 124. Disc 122 is situated in interdigital relationship with respect to internally splined friction discs 126, which in turn are carried by the element 116.

A pressure plate 128 is located directly adjacent the clutch disc assembly. It forms an integral part of a sleeve 130, which is splined or keyed to the outer extremities of the fingers 80, which in turn form a part of the power output shaft 12 as mentioned earlier.

A pressure ring 133 is situated directly adjacent a cam member 134, the latter being splined at its hub to the sleeve extension 130 as shown at 136. A compression spring 132 is situated between the pressure plate 128 and the cam member 134.

V-shaped openings 138 are formed in the periphery of the cam member 134. These receive fingers 140 carried by a self-energizing cam element 142. This element is in the form of a ring which is splined to the drum 120 and held axially fast with respect to the drum 120 by snap ring 144.

Ball recesses 146 are formed in the left-hand face of the element 142. These are arranged in juxtaposition with respect to ball recesses 148 formed in the pressure plate 128.

Cam balls 150 are disposed between the recesses 146 and 148 when relative angular displacement takes place between pressure plate 128 and the drum 120. The balls 150 will assume a clamping position thereby exerting a clutch engaging pressure on the disc assembly. This engaging force complements the force of the spring 132.

A clutch disc engaging force may be applied to the pressure ring 133 by a clutch release lever 152 secured to clutch operating shaft 154.

The fingers 140 are situated between reaction ring 158 and shoulder 168 formed on the member 13. Shoulder 168 engages member 142 when the member 134 is shifted in its extreme right-hand position. Under these conditions the force of the spring 132 is transmitted to the reaction plate 124 thereby permitting a clamping action to occur under the influence of the spring 132. As soon as the clutch release member is actuated, however, reaction shoulder 168 is disengaged from the member 142 thereby interrupting the engaging force due to the spring 132.

To condition the mechanism for operation in the lowest speed ratio, the clutch release lever 152 moves the clutch member 134 in a left-hand direction thereby causing it to slide on the spline 136. This causes the fingers 140 to enter the V-shaped slots 138 and causing the drum 120 to be centered with respect to the clutch element 128. This causes the balls 150 to assume a neutral or disengaged position as indicated in FIGS. 3 and 6. This motion occurs against the resisting force of the spring 132. The clamping force thus produced by the camming action of the balls 150 is relieved.

Upon continued movement of the clutch element 134 in a left-hand direction as viewed in the drawings, a reaction ring 156 carried on the periphery of the element 134 engages the end 158 of the element 142. This causes the drum 120 to be shifted a slight amount in a left-hand direction thus introducing a clearance between the adjacent discs of the clutch disc assembly.

The torque delivery path between the output shaft and the sleeve shaft 82 is interrupted as the friction disc clutch assembly is disengaged. This relieves the torque acting on the gears, which will permit clutching engagement between the gear 74 and the clutch and the clutch element 104. Thus the engagement of the clutch element 104 with the gear 74 is effected by shifting the sleeve 82 in a right-hand direction from the position illustrated in FIG. 6 and FIG. 5A.

When the operator relieves the clutch disengaging force on the clutch lever 152, the spring 132 will return the cam member 134 in a right-hand direction. This will cause the fingers 140 to withdraw from the V-shaped slots 138 thereby permitting relative angular adjustment of the members 142 and 128.

Prior to withdrawal of the fingers 140 from the V-shaped slots 138, the ring 156 becomes released from the shoulder 158 of the member 142. This will permit the clutch discs to engage slightly as this initial engagement triggers the relative displacement of the drum 120 with respect to the member 142.

As soon as a torque is transmitted through the clutch disc assembly, the cam balls 150 establish a camming action, which fully engages the disc assembly. As the torque increases, the camming action and the clamping force produced by the balls 150 increases accordingly.

Torque is delivered under these conditions from the power input shaft 28, through the power input gear 72, gear element 48 of the cluster gear assembly 42, gear element 52, output gear 76, the synchronizer clutch structure shown in part at 104, sleeve 110, the engaged friction disc assembly, the cam mechanism shown in part at 150, sleeve 130, spline 80 and power output shaft 12.

To effect operation of a transmission mechanism in the intermediate speed ratio, the clutch is again disengaged in the manner previously described. The clutch sleeve 110 now is shifted so that the synchronizer clutch element 104 will engage the internal clutch teeth and the gear 74. Upon reengagement of the clutch disc assembly, torque is delivered from shaft 28, through gear 72, through gear elements 48 and 50, through gear 74 and sleeve 110, and finally through the clutch disc assembly to the output shaft 12.

High speed ratio is achieved by engaging directly the sleeve 110 with the input gear 72, this is done by shifting the sleeve 110 in its extreme left-hand position.

Reverse drive is achieved by shifting the sleeve 110 to the extreme right-hand position. This causes clutch element 104 to engage the internal clutch teeth of the gear 78. Torque then is delivered from the shaft 28, through gear 72 and the cluster gear assembly 42 to the reverse drive pinion 62. These in turn reverses the direction of the torque as it is delivered to the gear 78 and the sleeve shaft 110. Reverse torque then is delivered through the engaged clutch disc assembly to the output shaft 12.

During each shift interval, a minimum amount of mass is rotating due to the fact that the drum 120 and the associated clutch elements are fully disengaged from the rotating gear elements. This improves the quality of the shift.

The torque distributed through the disc assembly is transferred through a relatively large number of friction discs. While engaging the discs, a smooth initial clutch engagement pattern can be achieved. It is only after the clutch becomes engaged that the clamping force is increased, the amount of the clamping force being proportional to the torque delivered. This is due to the camming characteristic of the cam means shown in part at 150. The internally splined drum, which carries the clutch discs, is entirely independent of the power output shaft 12, and in this respect the neutral clutch structure differs from that shown in my earlier disclosures. If the neutral clutch structure of may earlier disclosure is designed specifically to achieve the proper clutch engagement characteristics under high torque delivery, of necessity the characteristics during initial clutch delivery, of necessity the characteristics during initial clutch engagement are not the optimum. COnversely, if the optimum clutch characteristics are designed into the clutch structure, excessive slipping in the clutch would occur when the torque is increased. With my instant design, however, it is not necessary to compromise the clutch engagement characteristics under one condition in favor of another.

To improve the lubrication of the discs and to effect proper cooling, I have provided a trough 160 in the upper region of the housing 18 where it will receive oil thrown from the rotating gear elements during operation. The lower portion of the main transmission housing 14 is provided with a sump in the usual fashion and one of the cluster gear assemblies partially rotates in the sump thereby permitting oil to be picked up from the sump and distributed through the gear system. It is this oil that is collected in the trough 160 and delivered downwardly through a drain 162 where the oil is allowed to collect in a rotating trough 164 in the interior of the clutch element 116. When the element 116 rotates, the oil collected in the trough 164 is distributed through lube openings 166 into the region of the rotating discs.

Having thus described a preferred form of my invention, what I claim and desire to secure by U.S. Letters patent is:

1. A power transmission mechanism for delivering torque from a driving shaft to a driven shaft, a power input gear connected to said driving shaft, multiple cluster gear assemblies engaged with said power input gear, power output gears journaled for rotation upon an axis that is common to the axis of rotation of said input shaft, said cluster gear assemblies engaging continuously said power outlet gears, a clutch shaft supported by said driven shaft and movable axially therealong, clutch elements situated in each of said output gears, a companion clutch element engaging each of said first-named clutch elements as it is moved axially through said gears, a clutch sleeve carrying said companion clutch element and journaled rotatably on said clutch shaft and fixed against axial movement relative thereto, a first friction clutch element carried by said sleeve, a second friction clutch element surrounding said first clutch element, friction discs carried by said first and second friction clutch elements in adjacent relationship to form a clutch disc assembly, a clutch pressure plate adjacent said discs and connected drivably to said power output shaft, the driving connection between said output shaft and said pressure plate permitting relative axial shifting movement of the latter with respect to the former, cam means for exerting a clamping force on said pressure plate including a first cam element carried by said second clutch element independently of said driven shaft and adapted for angular displacement relative to said driven shaft when said cam means is actuated to apply said force, which force tends to move said pressure plate toward said discs upon relative rotation of said second friction clutch element with respect to said pressure plate, a reaction ring secured to said second friction clutch element adjacent said disc assembly for accommodating the clamping force transmitted by said pressure plate, and a centering cam element registering with said first cam element and slidably connected to said pressure plate whereby relative axial movement thereof with respect to said pressure plate is permitted while angular motion therebetween is prevented, and a cam follower carried by said first cam element whereby said cam means is released upon movement of said centering cam element in one direction and the sole torque delivery path between said clutch shaft and said driven shaft is through said pressure plate.

2. A power transmission mechanism for delivering torque from a driving shaft to a driven shaft, a power input gear connected to said driving shaft, multiple cluster gear assemblies engaged with said power input gear, power output gears journaled for rotation upon an axis that is common to the axis of rotation of said input shaft, said cluster gear assemblies engaging continuously said power output gears, a clutch shaft connected drivably to said driven shaft and movable axially along said driven shaft, clutch elements situated in each of said output gears, a companion clutch element engaging each of said first-named clutch elements as it is moved axially through said gears, a clutch sleeve carrying said companion clutch element on said sleeve and journaled rotatably on said clutch shaft and fixed against axial movement relative thereto, a first friction clutch element carried by said sleeve, a second friction clutch element surrounding said first clutch element, friction discs carried by said first and second friction clutch elements in adjacent relationship to form a clutch disc assembly, a clutch pressure plate adjacent said disc connected drivably to said power output shaft, the driving connection between said output shaft and said pressure plate permitting relative axial shifting movement of the latter with respect to the former, cam means for exerting a clamping force on said pressure plate including a first cam element carried by said second clutch element independently of said driven shaft and adapted for angular displacement relative to said driven shaft when said cam means is actuated to apply said force, which force tends to separate said pressure plate and the adjacent parts of said second friction clutch element upon relative rotation of said second friction clutch element with respect to said pressure plate, a reaction ring secured to said second friction clutch element adjacent said disc assembly for accommodating the clamping force transmitted by said pressure plate, and a centering cam element registering with said first cam element and slidably connected to said pressure plate whereby relative axial movement thereof with respect to said pressure plate is permitted while angular motion therebetween is prevented, a cam follower carried by said first cam element whereby said cam means is released upon movement of said centering cam element in one direction, a spring situated between said pressure plate and said centering cam element whereby the latter is urged normally away from said clutch disc assembly, said centering cam element being connected to said second friction clutch element through said first cam element to permit a modified force transfer through said disc assembly when the former is shifted in said one direction as the spring force normally tends to maintain said clutch disc assembly in an engaged state.

3. A power transmission mechanism for delivering torque from a driving shaft to a driven shaft, a power input gear connected to said driving shaft, multiple cluster gear assemblies engaged with said power input gear, power output gears journaled for rotation upon an axis that is common to the axis of rotation of said input shaft, said cluster gear assemblies engaging continuously said power output gears, a clutch shaft connected drivably to said driven shaft and movable axially along said driven shaft, clutch elements situated in each of said output gears, a companion clutch element engaging each of said first named clutch elements as it is moved axially through said gears, a clutch sleeve carrying said companion clutch element on said sleeve and journaled rotatably on said clutch shaft and fixed against axial movement relative thereto, a first friction clutch element carried by said sleeve, a second friction clutch element surrounding said first clutch element, friction discs carried by said first and second friction clutch elements in adjacent relationship to form a clutch disc assembly, a clutch pressure plate adjacent said disc connected drivably to said power output shaft, the driving connection between said output shaft and said pressure plate permitting relative axial shifting movement of the latter with respect to the former, cam means for exerting a clamping force on said pressure plate including a first cam element carried by said second clutch element independently of said driven shaft and adapted for angular displacement relative to said driven shaft when said cam means is actuated to apply said force, which force tends to separate said pressure plate and the adjacent parts of said second friction clutch element upon relative rotation of said second friction clutch element with respect to said pressure plate, a reaction ring secured to said second friction clutch element adjacent said disc assembly for accommodating the clamping force transmitted by said pressure plate, a centering cam element registering with said first cam element and slidably connected to said pressure plate whereby relative axial movement thereof with respect to said pressure plate is permitted while angular motion therebetween is prevented, a cam follower carried by said first cam element whereby said cam means is released upon movement of said centering cam element in one direction, and a shoulder formed on said centering cam means and situated along a line of motion that intersects portions carried by said second friction clutch element when said centering cam element approaches its limiting position in a clutch disengaging direction whereby the reaction ring and the pressure plate are separated to permit clearance between the adjacent friction discs.

4. A power transmission mechanism for delivering torque from a driving shaft to a driven shaft, a power input gear connected to said driving shaft, multiple cluster gear assemblies engaged with said power input gear, power output gears journaled for rotation upon an axis that is common to the axis rotation of said input shaft, said cluster gear assemblies engaging continuously said power output gears, a clutch shaft connected drivably to said driven shaft and movable axially along said driven shaft, clutch elements situated in each of said output gears, a companion clutch element engaging each of said first named clutch elements as it is moved axially through said gears, a clutch sleeve carrying said companion clutch element on said sleeve and journaled rotatably on said clutch shaft and fixed against axial movement relative thereto, a first friction clutch element carried by said sleeve, a second friction clutch element surrounding said first clutch element, friction discs carried by said first and second friction clutch elements in adjacent relationship to form a clutch disc assembly, a clutch pressure plate adjacent said disc connected drivably to said power output shaft, the driving connection between said output shaft and said pressure plate permitting relative axial shifting movement of the latter with respect to the former, cam means for exerting a clamping force on said pressure plate including a first cam element carried by said second clutch element independently of said driven shaft and adapted for angular displacement relative to said driven shaft when said cam means is actuated to apply said force, which force tends to separate said pressure plate and the adjacent parts of said second friction clutch element upon relative rotation of said second friction clutch element with respect to said pressure plate, a reaction ring secured to said second friction clutch element adjacent said disc assembly for accommodating the clamping force transmitted by said pressure plate, and a centering cam element slidably connected to said pressure plate whereby relative axial movement thereof with respect to said pressure plate is permitted while angular motion therebetween is prevented, a cam follower carried by said first cam element and registering with the centering cam element whereby said cam means is released upon movement of said centering cam element in one direction, a spring situated between said pressure plate and said centering cam element whereby the latter is urged normally away from said clutch disc assembly, said centering cam element being connected to said second friction clutch element through said first cam element to permit a modified force transfer through said disc assembly when the former is shifted in said one direction under the force of said spring as the spring force normally tends to maintain said clutch disc assembly in an engaged state, and a shoulder formed on said centering cam means and situated along a line of motion that intersects portions carried by said second friction clutch element when said centering cam element approaches its limiting position in a clutch disengaging direction whereby the reaction ring and the pressure plate are separated to permit clearance between the adjacent friction clutch discs.

5. A power transmission mechanism for delivering torque from a driving shaft to a driven shaft, a power input gear connected to said driving shaft, multiple cluster gear assemblies engaged with said power input gear, power output gears journaled for rotation upon an axis that is common to the axis of rotation of said input shaft, said cluster gear assemblies engaging continuously said power output gears, a clutch shaft connected drivably to said driven shaft and movable axially along said driven shaft, clutch elements situated in each of said output gears, a companion clutch element engaging each of said first named clutch elements as it is moved axially through said gears, a clutch sleeve carrying said companion clutch element on said sleeve and journaled rotatably on said clutch shaft and fixed against axial movement relative thereto, a first friction clutch element carried by said sleeve, a second friction clutch element surrounding said first clutch element, friction discs carried by said first and second friction clutch elements in adjacent relationship to form a clutch disc assembly, a clutch pressure plate adjacent said disc connected drivably to said power output shaft, the driving connection between said output shaft and said pressure plate permitting relative axial shifting movement of the latter with respect to the former, cam means for exerting a clamping force on said pressure plate including a first cam element carried by said second clutch element independently of said driven shaft and adapted for angular displacement relative to said driven shaft when said cam means is actuated to apply said force, which force tends to separate said pressure plate and the adjacent parts of said second friction clutch element upon relative rotation of said second friction clutch element with respect to said pressure plate, a reaction ring secured to said second friction clutch element adjacent said disc assembly for accommodating the clamping force transmitted by said pressure plate, a centering cam element registering with said first cam element and slidably connected to said pressure plate whereby relative axial movement thereof with respect to said pressure plate is permitted while angular motion therebetween is prevented, a cam follower carried by said first cam element and registering with the centering cam element whereby said cam means is released upon movement of said centering cam element in one direction, said cam means including a personally operable lever means for shifting said centering cam element in said one direction to effect clutch disengagement while permitting it to move in the opposite direction to effect clutch engagement, and second personal operable means for shifting said clutch shaft when said friction clutch assembly is disengaged thereby effecting speed ratio changes.

6. A power transmission mechanism for delivering torque from a driving shaft to a driven shaft, a power input gear connected to said driving shaft, multiple cluster gear assemblies engaged with said power input gear, power output gears journaled for rotation upon an axis that is common to the axis rotation of said input shaft, said cluster gear assemblies engaging continuously said power output gears, a clutch shaft connnected drivably to said driven shaft and movable axially along said driven shaft, clutch elements situated in each of said output gears, a companion clutch element engaging each of said first named clutch elements as it is moved axially through said gears, a clutch sleeve carrying said companion clutch element on said sleeve and journaled rotatably on said clutch shaft and fixed against axial movement relative thereto, a first friction clutch element carried by said sleeve, a second friction clutch element surrounding said first clutch element, friction discs carried by said first and second friction clutch elements in adjacent relationship to form a clutch disc assembly, a clutch pressure plate adjacent said disc connected drivably to said power output shaft, the driving connection between said output shaft and said pressure plate permitting relative axial shifting movement of the latter with respect to the former, cam means for exerting a clamping force on said pressure plate including a first cam element carried by said second clutch element independently of said driven shaft and adapted for angular displacement relative to said driven shaft when said cam means is actuated to apply said force, which force tends to separate said pressure plate and the adjacent parts of said second friction clutch element upon relative rotation of said second friction clutch element with respect to said pressure plate, a reaction ring secured to said second friction clutch element adjacent said disc assembly for accommodating the clamping force transmitted by said pressure plate, and a centering cam element slidably connected to said pressure plate whereby relative axial movement thereof with respect to said pressure plate is permitted while angular motion therebetween is prevented, a cam follower connected to said first cam element and registering with the centering cam element whereby said clutch assembly is released upon movement of said centering cam element in one direction, a spring situated between said pressure plate and said centering cam element whereby the latter is urged normally away from said clutch disc assembly, said centering cam element being connected to said second friction clutch element through said first cam element to permit a modified force transfer through said disc assembly when the former is shifted in said one direction under the force of said spring as the spring force normally tends to maintain said clutch disc assembly in an engaged state, said cam means including a personally operable lever means for shifting said centering cam element in said one direction to effect clutch disengagement while permitting it to move in the opposite direction to effect clutch engagement, and second personal operable means for shifting said clutch shaft when said friction clutch assembly is disengaged thereby effecting speed ratio changes.

7. A power transmission mechanism for delivering torque from a driving shaft to a driven shaft, a power input gear connected to said driving shaft, multiple cluster gear assemblies engaged with said power input gear, power output gears journaled for rotation upon an axis that is common to the axis rotation of said input shaft, said cluster gear assemblies engaging continuously said power output gears, a clutch shaft connected drivably to said driven shaft and movable axially along said driven shaft, clutch elements situated in each of said output gears, a companion clutch element engaging each of said first named clutch elements as it is moved axially through said gears, a clutch sleeve carrying said companion clutch element on said sleeve and journaled rotatably on said clutch shaft and fixed against axial movement relative thereto, a first friction clutch element carried by said sleeve, a second friction clutch element surrounding said first clutch element, friction discs carried by said first and second friction clutch elements in adjacent relationship to form a clutch disc assembly, a clutch pressure plate adjacent said disc connected drivably to said power output shaft, the driving connection between said output shaft and said pressure plate permitting relative axial shifting movement of the latter with respect to the former, cam means for exerting a clamping force on said pressure plate including a first cam element carried by said second clutch element independently of said driven shaft and adapted for angular displacement relative to said driven shaft when said cam means is actuated to apply said force, which force tends to separate said pressure plate and the adjacent parts of said second friction clutch element upon relative rotation of said second friction clutch element with respect to said pressure plate, a reaction ring secured to said second friction clutch element adjacent said disc assembly for accommodating the clamping force transmitted by said pressure plate, and a centering cam element slidably connected to said pressure plate whereby relative axial movement thereof with respect to said pressure plate is permitted while angular motion therebetween is prevented, a cam follower carried by said first cam element and registering with the centering cam element whereby said clutch assembly is released upon movement of said centering cam element in one direction and a shoulder formed on said centering cam means and situated along a line of motion that intersects portions carried by said second friction clutch element when said centering cam element approaches its limiting position in a clutch disengaging direction whereby the reaction ring and the pressure plate are separated to permit clearance between the adjacent friction discs, said cam means including a personally operable lever means for shifting said centering cam element in said one direction to effect clutch disengagement while permitting it to move in the opposite direction to effect clutch engagement, and second personally operable means for shifting said clutch shaft when said friction clutch assembly is disengaged thereby effecting speed ratio changes.

8. A power transmission mechanism for delivering torque from a driving shaft to a driven shaft, a power input gear connected to said driving shaft, multiple cluster gear assemblies engaged with said power input gear, power output gears journaled for rotation upon an axis that is common to the axis rotation of said input shaft, said cluster gear assemblies engaging continuously said power output gears, a clutch shaft connected drivably to said driven shaft and movable axially along said driven shaft, clutch elements situated in each of said output gears, a companion clutch element engaging each of said first named clutch elements as it is moved axially through said gears, a clutch sleeve carrying said companion clutch element on said sleeve and journaled rotatably on said clutch shaft and fixed against axial movement relative thereto, a first friction clutch element carried by said sleeve, a second friction clutch element surrounding said first clutch element, friction discs carried by said first and second friction clutch elements in adjacent relationship to form a clutch disc assembly, a clutch pressure plate adjacent said disc connected drivably to said power output shaft, the driving connection between said output shaft and said pressure plate permitting relative axial shifting movement of the latter with respect to the former, cam means for exerting a clamping force on said pressure plate including a first cam element carried by said second clutch element independently of said driven shaft and adapted for angular displacement relative to said driven shaft when said cam means is actuated to apply said force, which force tends to separate said pressure plate and the adjacent parts of said second friction clutch element upon relative rotation of said second friction clutch element with respect to said pressure plate, a reaction ring secured to said second friction clutch element adjacent said disc assembly for accommodating the clamping force transmitted by said pressure plate, a centering cam element slidably connected to said pressure plate whereby relative axial movement thereof with respect to said pressure plate is permitted while angular motion therebetween is prevented, a cam follower connected to said second friction clutch element and registering with the centering cam element whereby said clutch assembly is released upon movement of said centering cam element in one direction, a spring situated between said pressure plate and said centering cam element whereby the latter is urged normally away from said clutch disc assembly, said centering cam element being connected to said second friction clutch element through said first clutch element to permit a modified force transfer through said disc assembly when the former is shifted in said one direction under the force of said spring as the spring force normally tends to maintain said clutch disc assembly in an engaged state, and a shoulder formed on said centering cam means and situated along a line of motion that intersects portions of said second friction clutch element when said centering cam element approaches its limiting position in a clutch disengaging direction whereby the reaction ring and the pressure plate are separated to permit clearance between the adjacent friction clutch discs, said cam means including a personally operable lever means for shifting said centering cam element in said one direction to effect clutch disengagement while permitting it to move in the opposite direction to effect clutch engagement, and second personally operable means for shifting said clutch shaft when said friction clutch assembly is disengaged thereby effecting speed ratio changes.